(12) United States Patent
Wang et al.

(10) Patent No.: US 8,785,053 B2
(45) Date of Patent: Jul. 22, 2014

(54) CURRENT COLLECTOR AND LITHIUM ION BATTERY

(75) Inventors: Jia-Ping Wang, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 48 days.

(21) Appl. No.: 13/337,020

(22) Filed: Dec. 23, 2011

(65) Prior Publication Data

US 2013/0045413 A1 Feb. 21, 2013

(30) Foreign Application Priority Data

Aug. 16, 2011 (CN) .......................... 2011 1 0234427

(51) Int. Cl.
*H01M 4/66* (2006.01)
*H01M 4/64* (2006.01)

(52) U.S. Cl.
CPC ................ *H01M 4/663* (2013.01); *H01M 4/66* (2013.01); *H01M 4/64* (2013.01)
USPC .......................................... 429/238; 429/233

(58) Field of Classification Search
USPC .................................. 252/500; 977/742–755
See application file for complete search history.

(56) References Cited

U.S. PATENT DOCUMENTS

| | | | |
|---|---|---|---|
| 6,569,559 B1 * | 5/2003 | Rouillard et al. ............. | 429/120 |
| 2002/0106552 A1 | 8/2002 | Yamaura et al. | |
| 2008/0241655 A1 * | 10/2008 | Ogawa et al. ................. | 429/120 |
| 2008/0248235 A1 | 10/2008 | Feng et al. | |
| 2009/0098463 A1 | 4/2009 | Liu et al. | |
| 2009/0116171 A1 | 5/2009 | Liu et al. | |
| 2009/0317710 A1 * | 12/2009 | Douglas et al. ............... | 429/163 |
| 2010/0086837 A1 * | 4/2010 | Asari et al. ..................... | 429/94 |
| 2010/0178564 A1 * | 7/2010 | Asari et al. ................. | 429/231.8 |
| 2010/0188934 A1 * | 7/2010 | Qian et al. .................... | 367/140 |
| 2010/0272950 A1 * | 10/2010 | Chen et al. .................... | 428/113 |
| 2010/0285352 A1 * | 11/2010 | Juzkow et al. ................ | 429/163 |
| 2011/0045349 A1 * | 2/2011 | Pushparaj et al. ............ | 429/212 |
| 2011/0149465 A1 * | 6/2011 | Hashimoto et al. ........ | 361/301.4 |

FOREIGN PATENT DOCUMENTS

| | | |
|---|---|---|
| CN | 1466789 | 1/2004 |
| CN | 101276901 | 10/2008 |
| CN | 101409337 | 4/2009 |
| CN | 101425380 | 5/2009 |
| TW | 200833862 | 8/2008 |
| WO | WO 2010067509 A1 * | 6/2010 |

* cited by examiner

*Primary Examiner* — Ula C Ruddock
*Assistant Examiner* — Scott J Chmielecki
(74) *Attorney, Agent, or Firm* — Novak Druce Connolly Bove + Quigg LLP

(57) ABSTRACT

A current collector includes a support and at least one carbon nanotube layer. The support includes two surfaces. The at least one carbon nanotube layer is located on one of the two surfaces of the support. The at least one carbon nanotube layer includes a number of uniformly distributed carbon nanotubes. A lithium ion battery includes a cathode electrode and an anode electrode. At least one of the cathode electrode and the anode electrode includes the current collector.

14 Claims, 9 Drawing Sheets

CURRENT COLLECTOR AND LITHIUM ION BATTERY

CROSS-REFERENCE TO RELATED APPLICATIONS

This application claims all benefits accruing under 35 U.S.C. §119 from China Patent Application No. 201110234427.4, filed on Aug. 16, 2011, in the China Intellectual Property Office, the contents of which are hereby incorporated by reference.

BACKGROUND

1. Technical Field

The present disclosure relates to current collectors and lithium ion batteries using the current collectors.

2. Description of Related Art

A lithium ion battery includes a case, an anode, a cathode, a non-aqueous electrolyte, and a separator. The anode, cathode, non-aqueous electrolyte, and separator are encapsulated in the case. The separator is located between the anode and the cathode. The anode, cathode and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and the current collector is used to permit connection to an external power source during the recharging of the lithium ion battery. The current collectors are usually made of metal foils, such as copper foil and aluminum foil. However, the metal foils always have relatively large weight. The power density is calculated by power/weight. Therefore, the large weight of current collector will decrease the power density of a lithium ion battery. Furthermore, the metal foils may be corroded by the electrolyte, which decreases the life span of the lithium ion battery.

What is needed, therefore, is to provide a current collector having relatively low weight and high resistance to corrosion.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
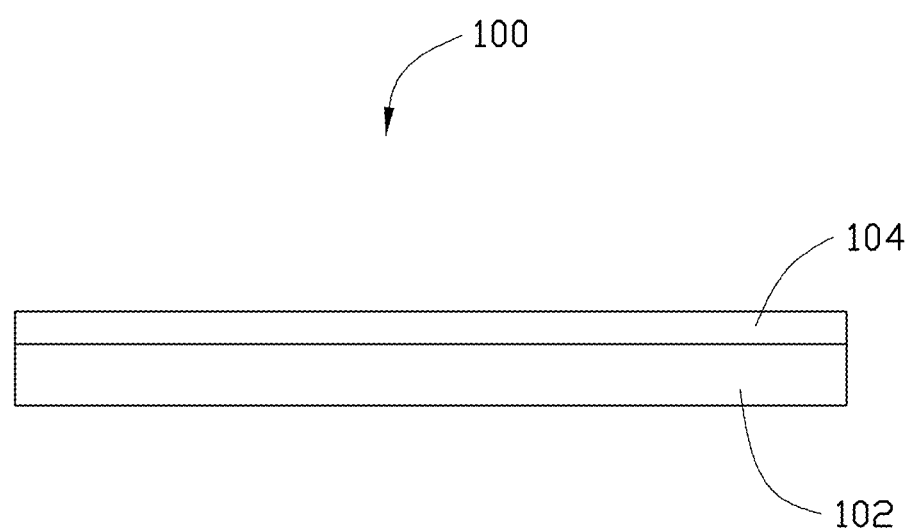
FIG. 1 is a schematic side view of an embodiment of a current collector.

Referring to FIG. 1, an embodiment of a current collector 100 used in lithium ion battery includes a support 102 and a carbon nanotube layer 104. The carbon nanotube layer 104 is located on a surface of the support 102.

The support 102 supports the carbon nanotube layer 104. The material of the support 102 has relatively small density and has relatively good resistance to corrosion, such as polymer materials, ceramics, crystal, and glass. The material of the support 102 can be an electrically insulating material. The support 102 can have a layered shape, such as a sheet, a film, or a plate. The thickness of the support 102 can be in a range from about 1 micron to about 1 millimeter.

The carbon nanotube layer 104 includes a plurality of carbon nanotubes uniformly distributed therein. The carbon nanotubes in the carbon nanotube layer 104 can be combined with each other by van der Waals attractive force therebetween. The carbon nanotubes can be disorderly or orderly arranged in the carbon nanotube layer 104. The term 'disorderly' describes the carbon nanotubes being arranged along many different directions, such that the number of carbon nanotubes arranged along each different direction can be almost the same (e.g. uniformly disordered); and/or entangled with each other. The term 'orderly' describes the carbon nanotubes being arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube layer 104 can be single-walled, double-walled, or multi-walled carbon nanotubes. The thickness of the carbon nanotube layer 104 is not limited, and can be in a range from about 0.5 nanometers to about 1 centimeter. In one embodiment, the thickness of the carbon nanotube layer 104 is in a range from about 1 micron to about 1 millimeter. A plurality of micropores can be defined in the carbon nanotube layer 104. The micropores can be defined by adjacent carbon nanotubes. The diameter of the micropores can be smaller than or equal to about 50 microns. The carbon nanotube layer 104 can include at least one carbon nanotube film. In the carbon nanotube layer 104, more than one carbon nanotube film can be stacked together.

Figure 2:
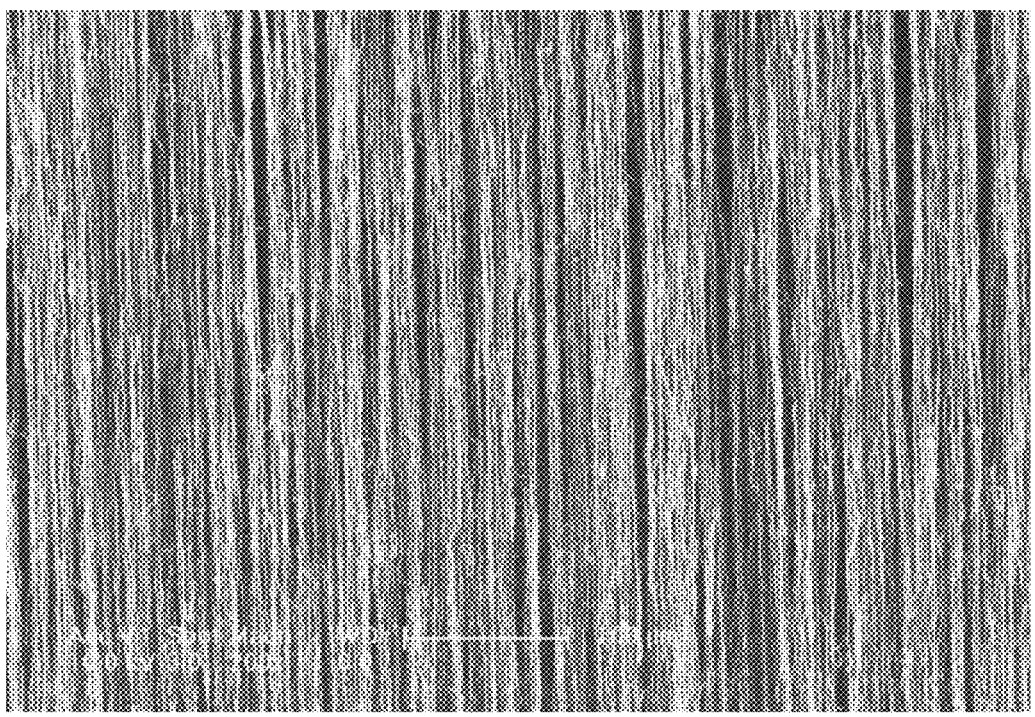
FIG. 2 is a scanning electron microscope (SEM) photo of an embodiment of a carbon nanotube film used in the current collector.

Referring to FIG. 2, in one embodiment, the carbon nanotube layer 104 can include at least one drawn carbon nanotube film. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array that is capable of having a film drawn therefrom. The plurality of carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" includes, but not limited to, a structure that does not have to be supported by a substrate. For example, a free-standing structure can sustain the weight of itself when it is hoisted by a portion thereof without any significant damage to its structural integrity. So, if the drawn carbon nanotube film is placed between two separate supporters, a portion of the drawn carbon nanotube film, not in contact with the two supporters, would be suspended between the two supporters and yet maintain film structural integrity. The free-standing structure of the drawn carbon nanotube film is realized by the successive carbon nanotubes joined end to end by van der Waals attractive force.

It can be appreciated that some variations can occur in the orientation of the carbon nanotubes in the drawn carbon nanotube film as can be seen in FIG. 2. Microscopically, the carbon nanotubes oriented substantially along the same direction may not be perfectly aligned in a straight line, and some curve portions may exist. It can be understood that a contact between some carbon nanotubes located substantially side by side and oriented along the same direction can not be totally excluded. More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. The carbon nanotubes in the drawn carbon nanotube film are also substantially oriented along a preferred orientation. The drawn carbon nanotube film can be a pure structure only including the carbon nanotubes. The thickness of the drawn carbon nanotube film can be in a range from about 0.5 nanometers to about 100 microns. The width and length of the drawn carbon nanotube film is not limited. When the carbon nanotube layer 104 includes a plurality of drawn carbon nanotube films, an angle between the aligned directions of the carbon nanotubes in at least two drawn carbon nanotube films can be in a range from about 0 degrees to about 90 degrees, for example can be equal to about 0 degrees, 15 degrees, 45 degrees, 60 degrees, or 90 degrees.

In another embodiment, the carbon nanotube layer 104 can include at least one flocculated carbon nanotube film formed by a flocculating method. The flocculated carbon nanotube film can include a plurality of long, curved, disordered carbon nanotubes entangled with each other. The length of the carbon nanotube film can be above 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. It is understood that the flocculated carbon nanotube film is very porous. Sizes of the micropores can be less than 10 micrometers. The porous nature of the flocculated carbon nanotube film will increase specific surface area thereof. Further, due to the carbon nanotubes in the flocculated carbon nanotube film being entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force therebetween. The thickness of the flocculated carbon nanotube film can range from about 1 micron to about 1 millimeter. It is also understood that many of the embodiments of the carbon nanotube structure are flexible and do not require the use of structural support to maintain their structural integrity. The flocculated carbon nanotube film can be a pure carbon nanotube film only including carbon nanotubes.

In another embodiment, the carbon nanotube layer 104 can include at least one pressed carbon nanotube film. The pressed carbon nanotube film can be formed by pressing a carbon nanotube array to slant the carbon nanotubes in the carbon nanotube array. The pressed carbon nanotube film can be a free-standing carbon nanotube film. The carbon nanotubes in the pressed carbon nanotube film are arranged along a same direction, along more than one predetermined different directions, or randomly arranged. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. The thickness of the pressed carbon nanotube film can be in a range from about 1 micron to about 1 millimeter. The pressed carbon nanotube film can be pure carbon nanotube film only including carbon nanotubes. The length and width of the pressed carbon nanotube film depend on the carbon nanotube array that is pressed. When the length and width of the carbon nanotube array is relatively large, the pressed carbon nanotube film can have relatively large length and width.

The carbon nanotube layer 104 can be adhered to the surface of the support 102 by using an adhesive or only by van der Waals attractive force therebetween. The drawn carbon nanotube film can be directly adhered to the surface of the support without using any adhesive, and only by van der Waals attractive force between the drawn carbon nanotube film and the surface of the substrate. When the material of the support 102 is polymer material, the carbon nanotube layer 104 can be fixed on the surface of the support 102 by a hot pressing process.

Figure 3:
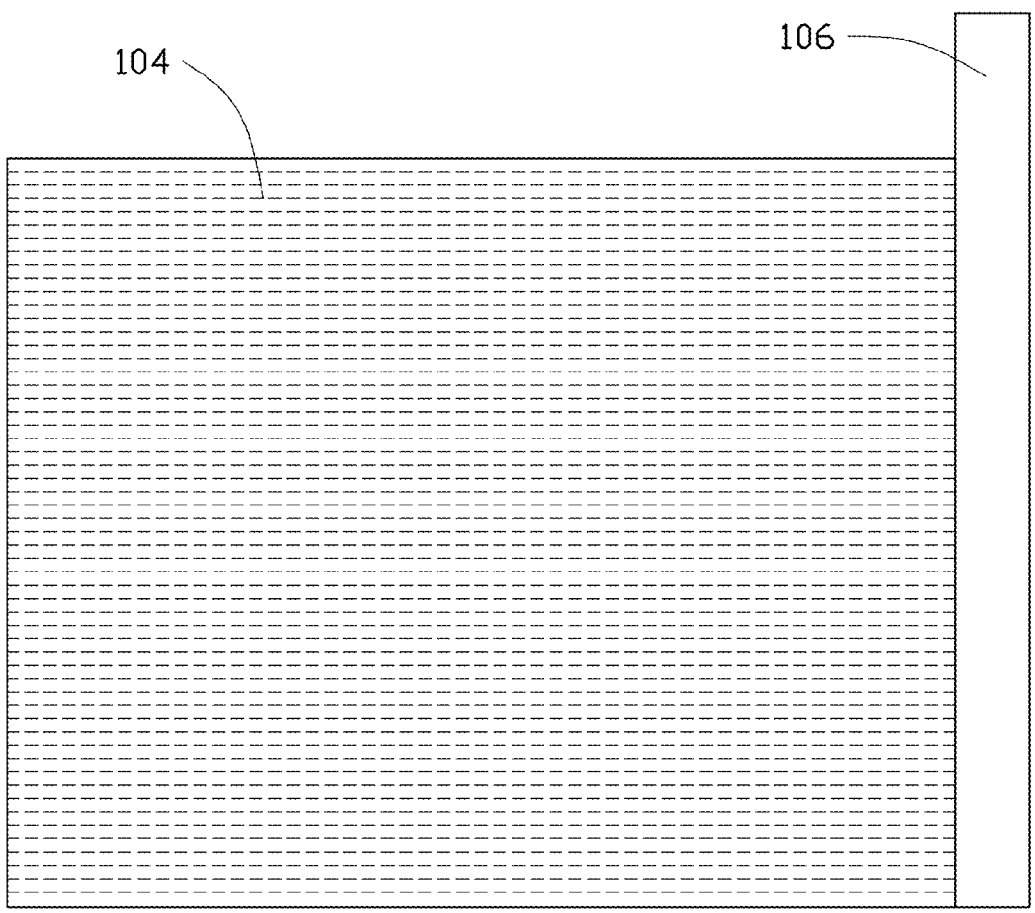
FIG. 3 is a schematic top view of an embodiment of a current collector.

Referring to FIG. 3, the current collector 100 can further include a conducting tab 106 electrically connected to the carbon nanotube layer 104. The material of the conducting tab 106 can be a conducting material such as metal. To prevent the corrosion of the conducting tab 106 by the electrolyte, a protecting layer can be coated on an outside surface of the conducting tab 106. In one embodiment, a polymer material layer is coated on the conducting tab 106 after the conducting tab 106 is connected to the carbon nanotube layer 104.

The conducting tab 106 can be electrically connected to the carbon nanotube layer 104 by many methods. When the carbon nanotubes in the carbon nanotube layer 104 are aligned along the same direction, the conducting tab 106 can have a strip shape, and the conducting tab 106 can be arranged on the surface of the carbon nanotube layer 104 at one side of the carbon nanotube layer 104. The conducting tab 106 can be overlapped on the side of the carbon nanotube layer 104. The length direction of the strip shaped conducting tab 106 can be perpendicular to the aligned direction of the carbon nanotubes in the carbon nanotube layer 104. The carbon nanotubes have superior conductivity along the axial direction. Therefore, in this arranged manner, the charges in the carbon nanotube layer 104 can be rapidly conducted to the conducting tab 106. The conducting tab 106 can have a line shaped contact and connection area with the carbon nanotube layer 104.

Figure 4:
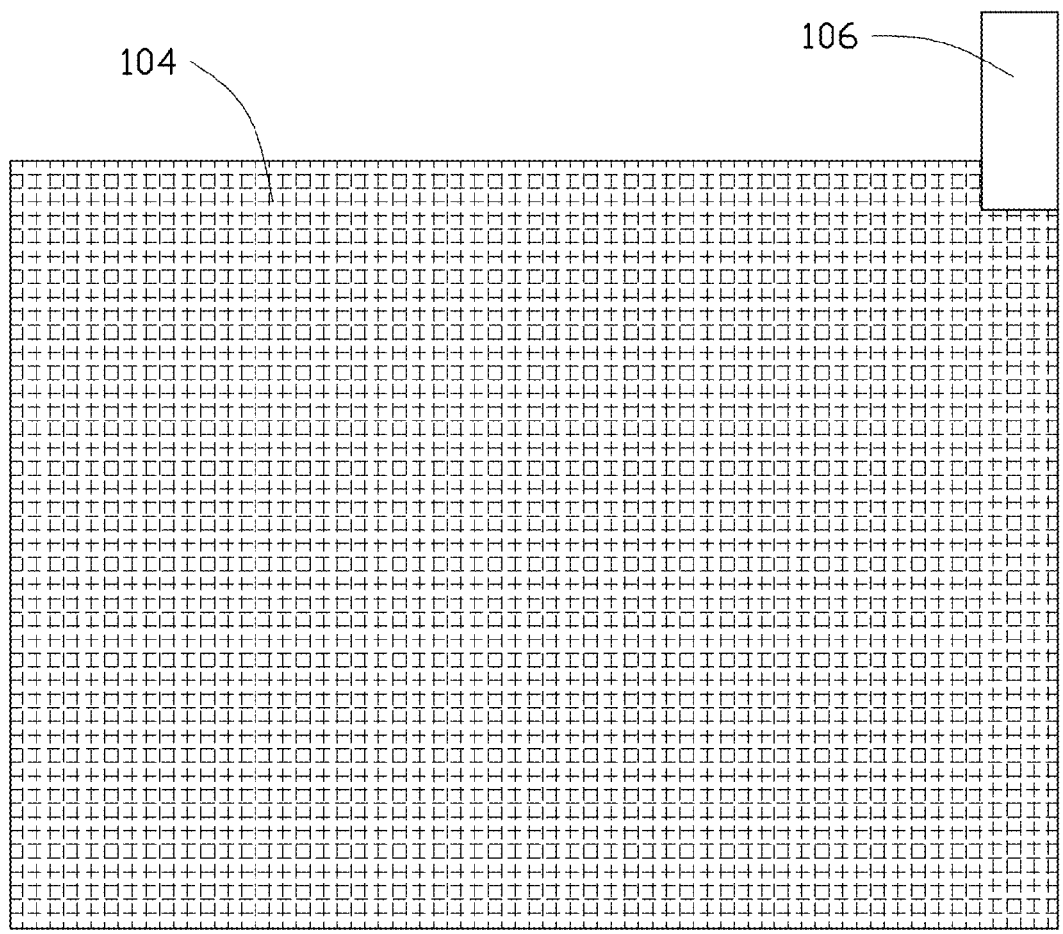
FIG. 4 is a schematic top view of another embodiment of a current collector.

Referring to FIG. 4, when the carbon nanotubes are disorderly arranged or intercrossed with each other in the carbon nanotube layer 104 to form a conducting network, the conducting tab 106 can has a strip shape and only has an end of the strip in contact with the carbon nanotube layer 104. The conducting tab 106 can be electrically connected to the carbon nanotube layer 104 through a point contact. In one embodiment, the carbon nanotube layer 104 includes at least two stacked drawn carbon nanotube films. The carbon nanotubes in the two drawn carbon nanotube films are perpendicular to each other. The carbon nanotubes in the two drawn carbon nanotube films can be respectively parallel to the two perpendicular edges of the carbon nanotube layer 104. The conducting tab 106 can be arranged at the corner of the carbon nanotube layer 104 formed by the two perpendicular edges.

The current collector 100 includes the carbon nanotube layer 104 and the support 102. The support 102 comprises a material that has a relatively small density and good corrosion resistance, and the support 102 does not need to be conductive. The carbon nanotube layer can have relatively good conductivity, stable chemical and electrical stability, and low weight. Therefore, the current collector can have a low weight, and the current collector is not easy to be corroded, thus have a relatively long life span.

Figure 5:
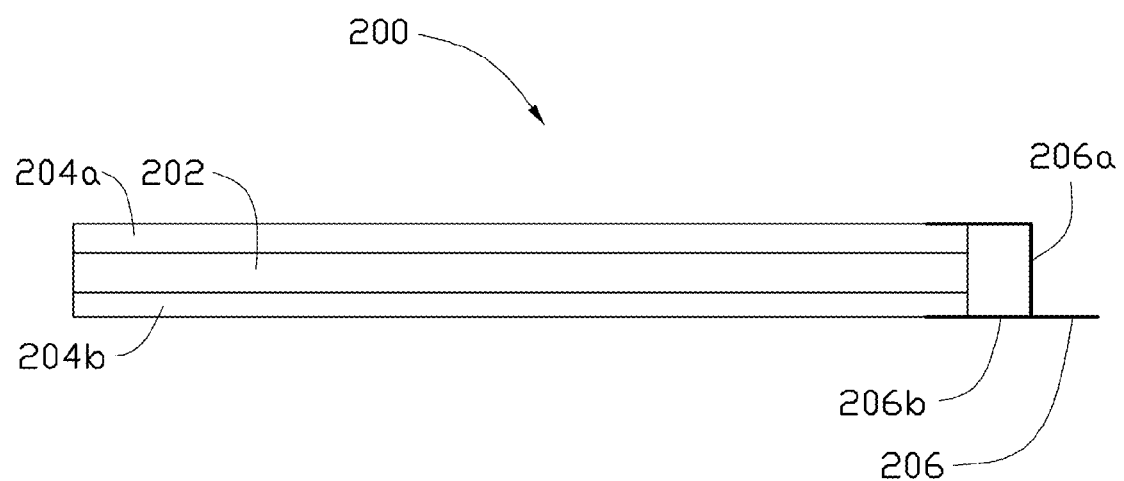
FIG. 5 is a schematic side view of another embodiment of a current collector.

Referring to FIG. 5, another embodiment of a current collector 200 includes a support 202 having two opposite surfaces, a first carbon nanotube layer 204a, and a second carbon nanotube layer 204b. The first carbon nanotube layer 204a and the second carbon nanotube layer 204b are respectively located on the two opposite surfaces of the support 202. The first carbon nanotube layer 204a and the second carbon nanotube layer 204b both can have the same structure as the carbon nanotube layer 104 of the above described embodiment. In the same current collector 200, the first carbon nanotube layer 204a and the second carbon nanotube layer 204b can have the same or different structures.

The current collector 200 can include a conducting tab 206 electrically connected to the first and second carbon nanotube layers 204a, 204b. The conducting tab 206 can have two branches, which are the first branch 206a and the second branch 206b. The first branch 206a is electrically connected to the first carbon nanotube layer 204a, and the second branch 206b is electrically connected to the second carbon nanotube layer 204b. The electrical connection between the branches 206a, 206b and the carbon nanotube layers 204a, 204b can be the same as the electrical connection between the connecting tab 206 and the carbon nanotube layer 104 in the above described embodiment.

The other structures and properties of the current collector 200 is the same as the current collector 100 of the above described embodiment.

Figure 6:
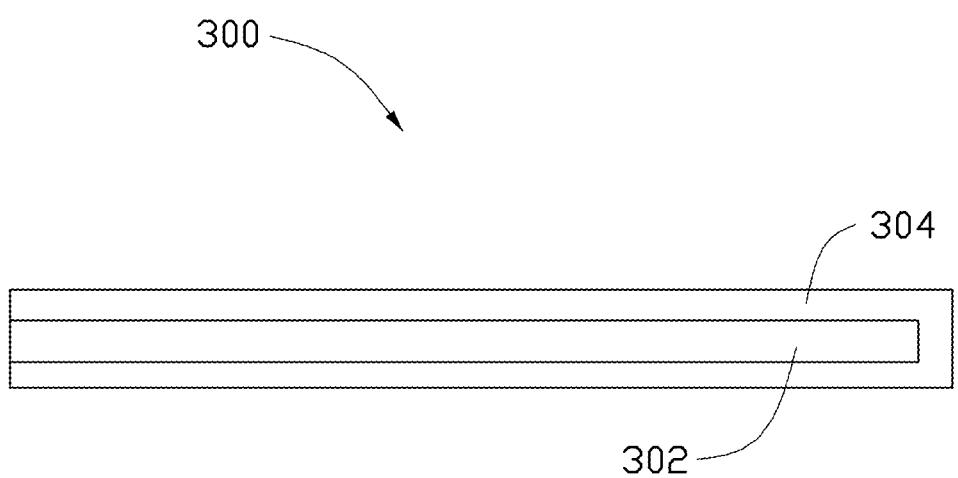
FIG. 6 is a schematic side view of still another embodiment of a current collector.

Referring to FIG. 6, another embodiment of a current collector 300 includes a support 302 and a carbon nanotube layer 304. The support 302 has two opposite surfaces. The carbon nanotube layer 304 is curved and covers both the two opposite surfaces of the support 302, and it also covers a side wall connecting the two opposite surfaces of the support 302. The carbon nanotube layer 304 can have a U shape to half wrap the support 302. In another embodiment, the carbon nanotube layer 304 can entirely wrap the support 302. The carbon nanotube layer 304 can have the same structure as the carbon nanotube layer 104 of the above described embodiment.

The current collector 300 can further include a conducting tab (not shown) electrically connected to the carbon nanotube layer 304. The electrical connection between the conducting tab and the carbon nanotube layer 304 can be the same as the electrical connection between the conducting tab 106 and the carbon nanotube layer 104 in the above described embodiment.

The other structure and property of the current collector 300 are the same as the current collector 100 of the above described embodiment.

Figure 7:
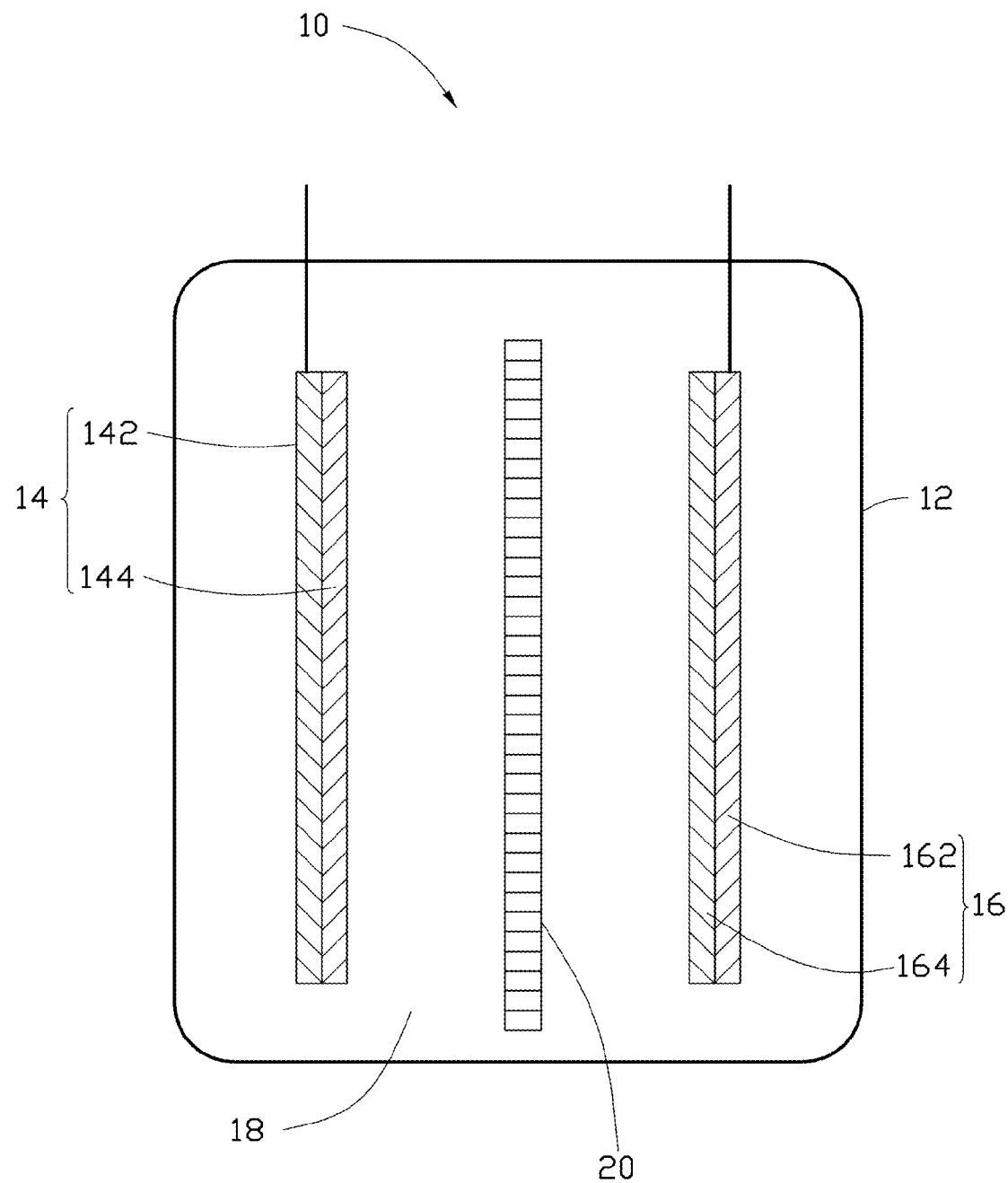
FIG. 7 is a schematic cross-sectional view of an embodiment of a lithium ion battery.

Referring to FIG. 7, a lithium ion battery 10 using the above described current collector includes a battery case 12, a cathode electrode 14, an anode electrode 16, an electrolyte 18 and a separator 20. The cathode electrode 14, the anode electrode 16, the electrolyte 18 and the separator 20 are encapsulated by the battery case 12. The electrolyte 18 is a liquid and is filled in the battery case 12. The cathode electrode 14, the anode electrode 16 and the separator 20 are located in the electrolyte 18. The separator 20 is located between the cathode electrode 14 and the anode electrode 16. Although only one cathode electrode 14 and one anode electrode 16 are shown in the FIG. 7, the lithium ion battery 10 can include a plurality of cathode electrodes 14 and a plurality of anode electrodes 16 alternatively stacked with each other. Each pair of the adjacent cathode electrodes 14 and anode electrodes 16 has a separator. The number of the cathode electrodes 14 and anode electrodes 16 is not limited. In one embodiment, the lithium ion battery 10 can include a single layer and up to 100 or more layers of cathode electrodes 14 and anode electrodes 16. In one embodiment, the lithium ion battery 10 respectively includes 20 layers to 50 layers of cathode electrodes 14 and anode electrodes 16.

The cathode electrode 14 includes a planar shaped cathode current collector 142 and a cathode material layer 144 located on a surface of the planar shaped cathode current collector 142. The anode electrode 16 includes a planar shaped anode current collector 162 and an anode material layer 164 located on a surface of the planar shaped anode current collector 162. The cathode material layer 144 of the cathode electrode 14 faces the anode material layer 164 of the anode electrode 16.

The battery case 12 can be flexible and made of polymer material. For example, the battery case 12 can be made of plastic or resin. The battery case 12 can be a plastic or resin bag sealing the electrolyte, the cathode electrode 14, the anode electrode 16 and the separator 20. Furthermore, all the material of the lithium ion battery 10 can be flexible, thus making the lithium ion battery 10 a flexible battery. The cathode current collector 142 and the anode current collector 162 can have flexible support with the carbon nanotube layer located thereon. The flexible support can be made of polymer material, such as plastic and resin.

Figure 8:
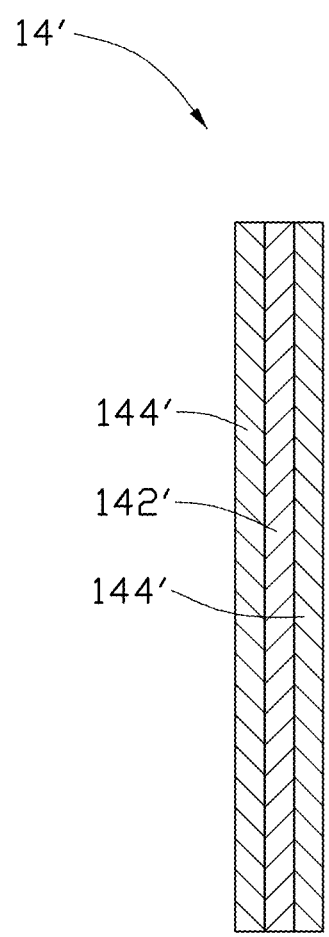
FIG. 8 is a schematic side view of an embodiment of a cathode electrode of the lithium ion battery.
Figure 9:
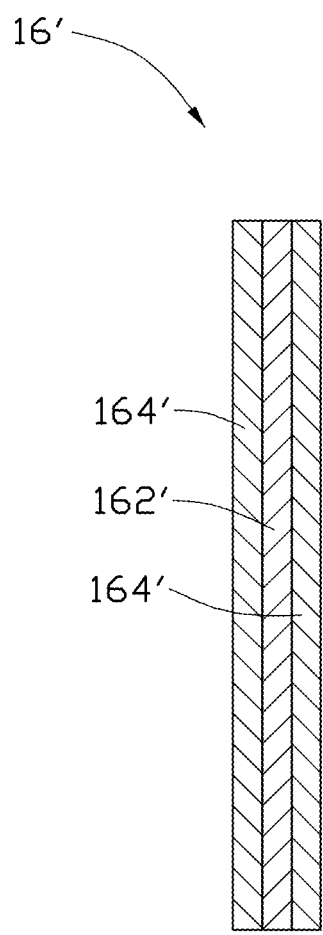
FIG. 9 is a schematic side view of an embodiment of an anode electrode of the lithium ion battery.

Referring to FIG. 8 and FIG. 9, in another embodiment, the cathode current collector 142' and the anode current collector 162' both use the current collectors 200, 300 in the above described embodiments in FIG. 5 or FIG. 6. The cathode electrode 14' includes two cathode material layers 144' respectively located on the two opposite surfaces of the cathode current collector 142'. The anode electrode 16' includes two anode material layers 164' respectively located on the two opposite surfaces of the anode current collector 162'. The cathode electrode 14' and the anode electrode 16' are stacked with each other, and the cathode electrode 14' and the anode electrode 16' are separated by the separator 20. The cathode conducting tab (not shown) of the cathode current collector 142' and the anode conducting tab (not shown) of the anode current collector 162' are used to electrically connect the lithium ion battery to an outer charge and/or discharge circuit. When the lithium ion battery includes a plurality of stacked cathode electrodes and anode electrodes, the plurality of the cathode conducting tabs are electrically connected, and the plurality of the anode conducting tabs are electrically connected. The cathode conducting tabs and the anode conducting tabs are separated from each other.

The lithium ion battery using the current collector in the above described embodiments has minimal weight and maximum life span. The current collector can also be used in other batteries, such as nickel batteries and solar cells.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium ion battery comprising:
    a cathode electrode comprising a cathode current collector and a cathode material layer located on the cathode current collector; and
    an anode electrode comprising an anode current collector and an anode material layer located on the anode current collector;
    wherein at least one of the cathode current collector and the anode current collector comprises:
        a support comprising two surfaces;
        at least one carbon nanotube layer located on one of the two surfaces of the support, the at least one carbon nanotube layer comprising a plurality of uniformly distributed carbon nanotubes; and
        a conducting tab being in direct contact with the at least one carbon nanotube layer;
        wherein the support is an electrically insulating support, the conducting tab is strip-shaped, and the plurality of uniformly distributed carbon nanotubes is parallel to the two surfaces of the support and substantially aligned along a same direction perpendicular to a lengthwise direction of the conducting tab.

2. The lithium ion battery of claim 1 further comprising a battery case, the cathode electrode and the anode electrode are located in the battery case.

3. The lithium ion battery of claim 1, wherein the conducting tab extends from one end of the carbon nanotube layer to an opposite end of the carbon nanotube layer.

4. The lithium ion battery of claim 1, wherein the plurality of uniformly distributed carbon nanotubes are successive and joined end-to-end by van der Waals attractive force therebetween.

5. A current collector comprising:
    a support comprising two surfaces;
    at least one carbon nanotube layer located on one of the two surfaces of the support, the at least one carbon nanotube layer comprising at least one carbon nanotube film, the at least one carbon nanotube film comprising a plurality of uniformly distributed carbon nanotubes; and
    a conducting tab being in direct contact with the at least one carbon nanotube layer;
    wherein the conducting tab has a strip shape, the plurality of uniformly distributed carbon nanotubes are parallel to the two surfaces of the support and substantially aligned along a same direction perpendicular to a length direction of the conducting tab.

6. The current collector of claim 5, wherein the support is an electrically insulating support.

7. The current collector of claim 6, wherein the conducting tab extends from one end of the carbon nanotube layer to an opposite end of the carbon nanotube layer.

8. The current collector of claim 5, wherein the plurality of uniformly distributed carbon nanotubes are successive and joined end-to-end by van der Waals attractive force therebetween.

9. The current collector of claim 5, wherein the at least one carbon nanotube layer collects a charge generated by a lithium ion battery.

10. The current collector of claim 5, wherein the at least one carbon nanotube layer comprises a first carbon nanotube layer and a second carbon nanotube layer respectively located on the two surfaces of the support.

11. The current collector of claim 5, wherein the at least one carbon nanotube layer consists of the plurality of uniformly distributed carbon nanotubes.

12. A lithium ion battery comprising:
    a cathode electrode comprising a cathode current collector and a cathode material layer located on the cathode current collector; and
    an anode electrode comprising an anode current collector and an anode material layer located on the anode current collector;
    wherein at least one of the cathode current collector and the anode current collector comprises:
        a support comprising two surfaces; and
        at least one carbon nanotube layer located on one of the two surfaces of the support, the at least one carbon nanotube layer comprising a plurality of uniformly distributed carbon nanotubes,
        wherein the support is an electrically insulating support, the at least one carbon nanotube layer comprises a plurality of stacked carbon nanotube films, the plurality of uniformly distributed carbon nanotubes in each of the plurality of stacked carbon nanotube films are aligned along the same direction, and the plurality of uniformly distributed carbon nanotubes in at least two of the plurality of stacked carbon nanotube films are perpendicular to each other.

13. The lithium ion battery of claim 12 further comprising a conducting tab electrically connected to the at least one carbon nanotube layer, wherein the conducting tab has a strip shape, the plurality of uniformly distributed carbon nanotubes in one of the plurality of stacked carbon nanotube films are substantially perpendicular to a length direction of the conducting tab.

14. The lithium ion battery of claim 13, wherein the conducting tab is in direct contact with the at least one carbon nanotube layer.

* * * * *